Patented May 22, 1934

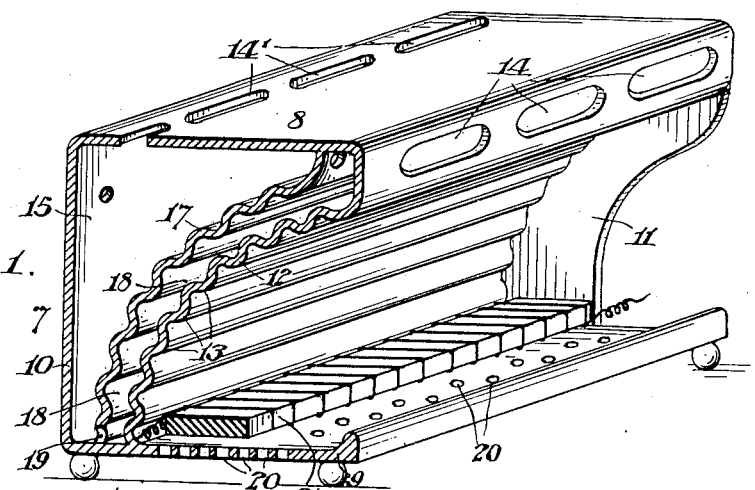
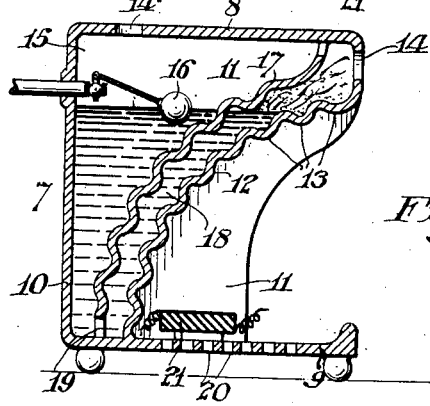
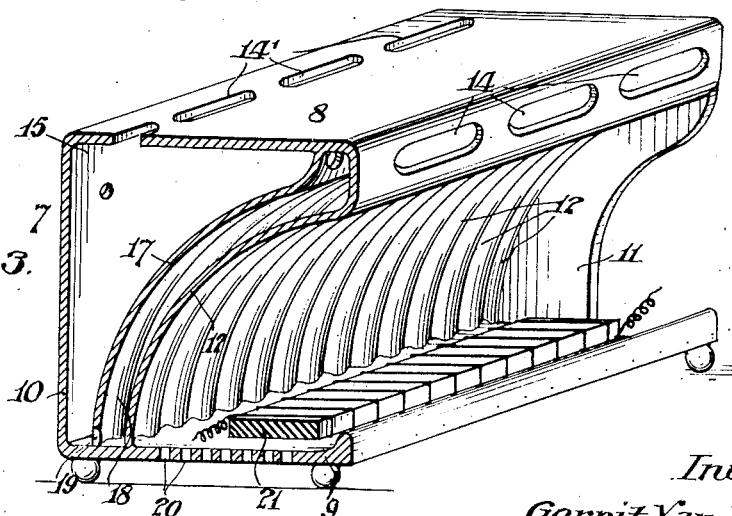

1,959,558

UNITED STATES PATENT OFFICE 1,959,558

AIR MOISTENING AND HEATING

Gerrit Van Daam, Buffalo, N. Y.

Application October 29, 1931, Serial No. 571,715
Renewed October 18, 1933

2 Claims. (Cl. 126—86)

The invention relates to improved means for simultaneously heating and moistening air.

The object is to provide improved means for maintaining a substantial body of water in proximity with a source of heat, and a thin film of water partly separated from the main body of water in closer proximity with said source of heat, whereby said film is superheated to give off vapor with the heat delivered from said source.

The invention comprises a chambered body or receptacle adapted to contain a substantial body of water, the front wall of said chambered body forming a heat deflector preferably curving upwardly and outwardly from bottom to top an inner wall or partition spaced from and substantially parallel with said front curved wall having an opening near the bottom for admitting water from said main body to said contracted space, and said front wall having an opening to atmosphere at or near the top thereof, and heat producing means associated with the lower part of said front wall, so that the heated air rising from said heat source will strike the deflector or front wall and be delivered to the surrounding atmosphere, at the same time heat will be transferred from said front wall to said film of water and also to said main body of water, whereby the main body of water will receive substantial heat, while the film of water will be superheated with the result that vapor will be delivered therefrom to mingle with the heated air delivered to the atmosphere.

Referring to the drawing, which illustrates merely by way of example, suitable means for effecting the invention:—

Fig. 1 is a view in perspective.

Fig. 2 is a vertical cross section.

Fig. 3 is a view in perspective showing vertical corrugations of the deflector.

Similar numerals refer to similar parts throughout the several views.

In Fig. 1 is shown the chambered body 7 having horizontal top wall 8, and bottom wall 9 and vertical rear and side walls 10 and 11. The front wall 12 is shown as provided with horizontal corrugations 13, extending, from the bottom wall at a point near the rear wall 10, and curving upwardly and outwardly to the outer margin of the top wall 8, and provided near its upper margin with a vapor outlet 14. Vapor outlets may also be provided in the top wall 8 as at 14'. This front wall 12 serves as a deflector and also as a reflector, being preferably of polished metal. Within the walls thus described is provided the reservoir 15 for water, the level of which is somewhat below the top wall 8, said level being preferably maintained by a float valve 16 or similar device.

Within the reservoir and to the rear of deflector or front wall 12 is provided a partition 17 slightly spaced from said front wall 12, and having preferably substantially parallel and corresponding corrugations, thus leaving a contracted space 18 for a film of water. This space is maintained in communication with the main reservoir by means of ports or openings such as 19.

The bottom horizontal wall 9 has an extension corresponding to that of the top wall 8, and is shown as provided with air inlets 20, over which is placed the heating element 21 such as an electric resistance. A gas burner or other suitable source of heat may of course be used.

*In operation.*—The heated air, rising from said heat source, strikes the deflector or front wall 12 thereby heating the same, as said heated air is delivered to the surrounding atmosphere. Heat is transferred from wall 12 to the film of water in contact with the inner side of said wall, and also to the main body of water. While the main body of water is maintained at high temperature the film of water in space 18 is superheated and vaporized, the vapor being delivered through outlet 14, which mixes with the heated air ascending from the said heat source.

It will be understood that the main body of water in the reservoir is made and kept hot by the heat from the heat source, which serves a double purpose. This heated body of water gives out a considerable heat to the surrounding atmosphere, and the heated water supplied therefrom to the film in space 18, facilitates the rapid vaporization of said film.

The whole device comprises a compact and efficient means for supplying heat and moisture to the surrounding atmosphere.

What I claim is:

1. In a device of the character described, the combination of a chambered body having vertical rear and side walls and horizontal top and bottom walls, a front wall curving outwardly and upwardly from near the rear of the bottom wall to the front of the top wall, said front wall provided with a vapor discharge vent at the upper part thereof, a partition wall within the chambered body spaced from and substantially parallel with the front wall thereby forming a contracted space to the rear of the front wall, said partition having a water passage near the bottom thereof for connecting the contracted space with the main chamber of the chambered body, and a heating element positioned near the bottom and in front of the front wall.

2. In a device of the character described, the combination of a chambered body having vertical rear and side walls, and horizontal top and bottom walls, a corrugated front wall curving outwardly and upwardly from near the rear of the bottom wall to the front of the top wall, said front wall provided with a vapor discharge vent at the upper part thereof, a correspondingly corrugated partition wall within the chambered body spaced from and substantially parallel with the front wall thereby forming a contracted space to the rear of the front wall, said partition having a water passage near the bottom thereof for connecting the contracted space with the main chamber of the chambered body, and a heating element positioned near the bottom and in front of the front wall.

GERRIT VAN DAAM.